US008892130B2

(12) United States Patent
Hudson et al.

(10) Patent No.: US 8,892,130 B2
(45) Date of Patent: Nov. 18, 2014

(54) SYSTEM FOR ENABLING INTERACTIVE SOCIALIZATION OF USERS AT A LOCATION OR GEOGRAPHIC RADIUS THEREOF

(76) Inventors: Robert P. Hudson, Long Valley, NJ (US); Peter R. Hyra, Manville, NJ (US)

( * ) Notice: Subject to any disclaimer, the term of this patent is extended or adjusted under 35 U.S.C. 154(b) by 228 days.

(21) Appl. No.: 13/373,415

(22) Filed: Nov. 14, 2011

(65) Prior Publication Data

US 2013/0122936 A1    May 16, 2013

(51) Int. Cl.
*H04W 24/00* (2009.01)
*H04W 4/02* (2009.01)
*H04W 4/20* (2009.01)
*H04B 7/00* (2006.01)

(52) U.S. Cl.
CPC ............. *H04W 4/02* (2013.01); *H04W 4/206* (2013.01)
USPC .............. 455/456.3; 455/518; 455/456.1; 455/456.2; 455/456.5; 455/456.6; 455/457

(58) Field of Classification Search
CPC .................................................. H04W 24/00
USPC ............... 455/414.1–414.3, 459, 456.1–457, 455/414.4–414.4, 466, 566, 517–519, 455/456.3; 707/621–622; 709/203–207
See application file for complete search history.

(56) References Cited

U.S. PATENT DOCUMENTS

| 6,334,127 B1 | 12/2001 | Bieganski et al. ............... 1/1 |
| 6,343,317 B1 | 1/2002 | Glorikian ...................... 709/218 |
| 6,802,068 B1 | 10/2004 | Guruprasad ................... 719/319 |
| 7,249,123 B2 | 7/2007 | Elder et al. ...................... 1/1 |
| 7,574,523 B2 | 8/2009 | Traversat et al. ............. 709/238 |
| 7,774,495 B2 | 8/2010 | Pabla et al. ................... 709/238 |
| 7,809,805 B2 | 10/2010 | Stremel et al. ................ 709/219 |
| 7,917,154 B2 | 3/2011 | Fortescue et al. .......... 455/456.1 |

(Continued)

FOREIGN PATENT DOCUMENTS

| KR | 20110070692 | 6/2011 | ............. G06F 17/00 |
| KR | 20110073219 | 6/2011 | ............. H04B 13/02 |

OTHER PUBLICATIONS

"Keep up with your friends, share the places you go, and discover the extraordinary in the world around you" found at http://gowalla.com/.
"What is foursquare?" found at https://foursquare.com/about.

(Continued)

*Primary Examiner* — Huy C Ho
(74) *Attorney, Agent, or Firm* — Ernest D. Buff & Assoc. LLC; Ernest D. Buff, Esq.; Harry Anagnest, Esq.

(57) ABSTRACT

A system enables interactive socialization of users having a wireless device at a venue. The system includes a registration mechanism for registering a user. A location determination mechanism comprises a global positioning system that identifies the longitude and latitude of other users. An on-location update mechanism publishes the availability of the service at a given venue. A data mechanism runs a list of active sessions against a user compatibility engine. A notification is transmitted to each user that contains a compatibility match listing compatible users at the venue. Intercommunication among users is provided through the system/application, whereby a user receives the compatibility match notification and can respond with a message, block or ignore based on a compatibility assessment. The subject system or application may be used for a dating aid for meeting others, or to create networking opportunities.

11 Claims, 2 Drawing Sheets

(56) References Cited

U.S. PATENT DOCUMENTS

| | | | |
|---|---|---|---|
| 8,005,893 B2 | 8/2011 | Tanimoto | 709/203 |
| 8,005,909 B2 | 8/2011 | Raman | 709/206 |
| 8,275,361 B2 * | 9/2012 | De Vries | 455/414.1 |
| 2002/0046259 A1 | 4/2002 | Glorikian | 709/218 |
| 2003/0050977 A1 | 3/2003 | Puthenkulam et al. | 709/204 |
| 2003/0120734 A1 | 6/2003 | Kagan et al. | 709/206 |
| 2004/0203901 A1 | 10/2004 | Wilson et al. | 455/456.1 |
| 2005/0038876 A1 | 2/2005 | Chaudhuri | 709/219 |
| 2006/0190557 A1 | 8/2006 | Bhogal et al. | 709/217 |
| 2010/0070581 A1 | 3/2010 | Hewes et al. | 709/206 |
| 2010/0325191 A1 | 12/2010 | Jung et al. | 709/202 |
| 2011/0142016 A1 * | 6/2011 | Chatterjee | 370/338 |
| 2013/0059606 A1 * | 3/2013 | Pujol | 455/456.3 |
| 2013/0210463 A1 * | 8/2013 | Busch | 455/456.3 |

OTHER PUBLICATIONS

"Places" found at https://www.facebook.com/places/.
"Spiderweb: A Social Mobile Network" found at http://ieexpolore.ieee.org/xpl/freeabs_all.jsp?arnumber=5483495.

* cited by examiner

SYSTEM FOR ENABLING INTERACTIVE SOCIALIZATION OF USERS AT A LOCATION OR GEOGRAPHIC RADIUS THEREOF

BACKGROUND OF THE INVENTION

1. Field of the Invention

The present invention relates to social networking systems; and, more particularly, to a peer-to-peer system for facilitating interactive socialization of users at a location or geographic radius or locus.

2. Description of the Prior Art

Millions of dollars in revenue are generated annually from online dating and social networking sites. Interest in online dating has soared over the years, and will continue to soar in years to come. Most recently, it has become commonplace for online dating websites to provide webcam chats between members. In addition, as the online dating population becomes larger, sites with specific demographics are becoming more popular as a way to narrow the pool of potential matches.

Online dating or Internet dating systems have been provided that allow individuals, couples and groups to make contact and communicate with each other over the Internet, usually with the objective of developing a personal or romantic relationship. Online dating services usually provide unmoderated matchmaking over the Internet, through the use of personal computers or cell phones.

The services generally require a prospective member to provide personal information before they can search the service provider's database for other individuals using criteria they set, such as age range, gender and location. Frequently sites allow members to upload photos and browse the photos of others. Additional services may also be offered; such as webcasts, online chat, telephone chat (VOIP), and message boards. Some sites provide free registration, but may offer services which require a monthly fee, while other sites rely on advertising for revenue. Many sites are broad-based, with members coming from a variety of backgrounds looking for different types of relationships. Other sites are more specific, based on the type of members, interests, location, or relationship desired.

Contact with members of online dating services, or social network services, is generally achieved through digital contact or telephone communication until a face-to-face meeting can be arranged. Smart phone and phone applications have implemented online dating services. Generally, the phone application notifies a member of other members who are in a local area. Various management servers and methods have been provided for yielding cloud computing services and systems and methods using presence in a data network for communication, and other server infrastructures. Additionally, various systems and methods for online, Smartphone application dating services have been provided.

Existing peer-to-peer social networking or dating applications generate notification of local matches where a member is located in the given vicinity—such as in the same store, park or other public location. However, this technique does not always provide a desirable effect. In many cases, the notification is generated without computing compatibility factors or match factors and there is a lack of confidence that the recommendation will be a good fit or match. As a result, unwanted solicitations may occur or otherwise unwanted, incompatible meetings may ensue, resulting in uncomfortable social circumstances.

Accordingly, a troublesome problem with existing peer-to-peer and/or date-meeting applications and systems is the propensity for incompatible members to be prompted for contacting or networking with one another. In such cases, the value of the prompt or notification of a local member is low and ineffective. The present invention overcomes the problems presented when peer-to-peer networking and dating is carried out with disregard for real-time compatibility recommendations.

SUMMARY OF THE INVENTION

The present invention provides a peer-to-peer system for enabling interactive socialization of users at a location or geographic radius or locus. The system, method and device broadly provides a computer networking/cloud service that extends IT existing capabilities, in real time, over the Internet or a networking system, to users (subscription-based or pay-per-use service). Members are notified of a compatibility match at a given location or local radius via GPS latitude and longitude positioning, thereby enabling them to connect at a given location.

Also provided by the present invention is a system for enabling interactive socialization of users at a venue. The system is embodied by an application for a mobile device/a wireless interactive device capable of (i) receiving and transmitting messages, (ii) accepting input via a user interface, and (iii) displaying messages on an electronic display; and further comprises registration means for registering a user or activating said system on said wireless interactive device.

In particular, the subject system or application may be used in connection with a dating application for meeting others, or as a networking/socializing application for people or users with similar interests. The system has a location determination means comprising a global positioning system that identifies the longitude and latitude of other users. The system further includes on location update means for publishing the availability of the service at a given venue or vicinity thereof It is contemplated that the venue include the local vicinity of a given mile radius, depending on the type of venue. For example, where the venue is a shopping mall or sporting event, the venue vicinity may include the parking lot of the mall or event. During sporting events or concert events/or other entertainment events, the venue preferably includes the arena, while the vicinity includes the parking lot—so that tailgaters at the sporting event/concert event can meet through the application. The radius/vicinity can include a given radius such as, for example, one—three city blocks from one another, or the like. The user location means is carried out by the system for checking for other active sessions within the venue or vicinity. The system further includes data means for running a list of active sessions against a user compatibility engine. The system is appointed for the transmission of a notification to each user issuing a compatibility match listing compatible users at the venue. Intercommunication means is provided through the system/application wherein the user receives the compatibility match notification and can (i) respond with a message, (ii) block or (iii) ignore the message, based on the compatible of the user/users located at the venue.

In another embodiment, the system for enabling interactive socialization of users at a location or geographic radius or locus comprises a network/cloud service, registration means for registering a user, location determination means comprising global positioning system providing a local latitude and longitude location and on-location update means for publishing the availability of the service. The system also includes user location means carried out by the service for checking for other active sessions within a geographic region based on the location. Data means is also provided for running a list of active sessions against a user compatibility engine. Transmission of a notification is provided to each user upon creation of a compatibility match; the notification lists compatible users in the location. The system further includes intercommunication means whereby the user receives the compatibility match notification and can respond with a message, block or ignore based on the compatible user/users present at the location.

An electronic processing method for using the above system is also provided for generating a compatibility match notification of users at a location or geographic radius or locus. The electronic processing method comprises a processing system containing one or more processors configured to receiving applicable data, including registration data for a users, location data comprising global positioning system data providing local latitude and longitude locations, user compatibility data, on-location update capability for publishing availability of the system, and user location capability for checking for other users within the geographical radius or locus. The method further includes producing a compatibility recommendation from the user compatibility data and the location data, and transmitting a notification to each user issuing a compatibility match at the location.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

Figure 1:
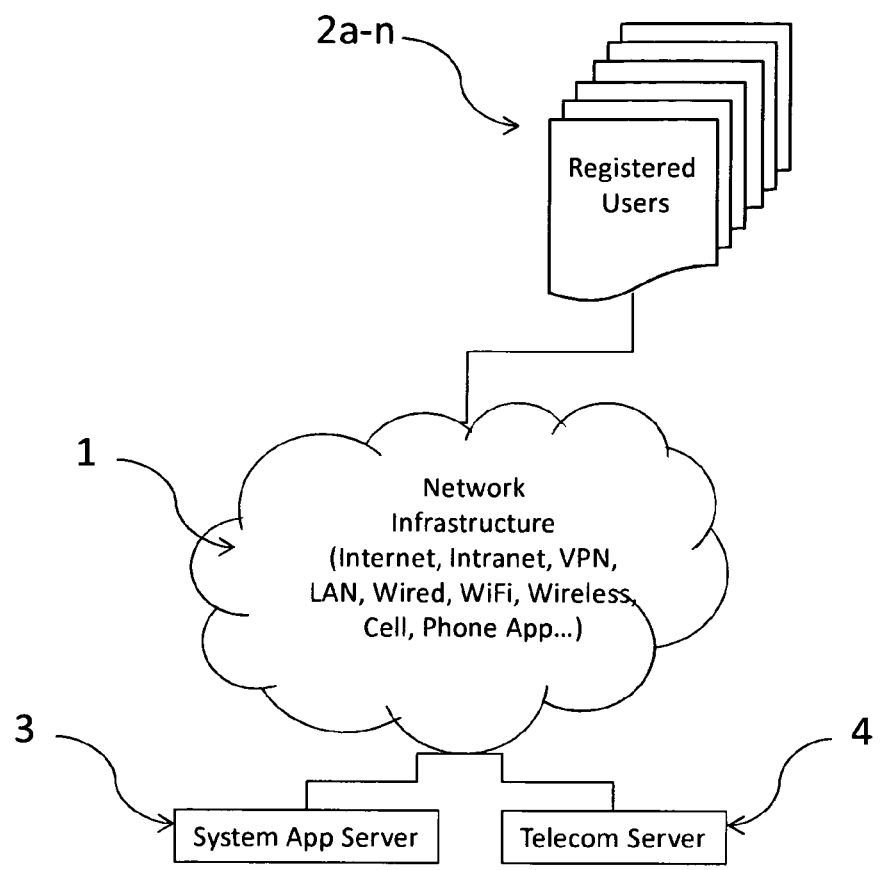
FIG. 1 is an illustration of a basic schematic view of the platform that may be utilized by the system.

This invention is directed to a peer-to-peer system for enabling interactive socialization of users at a location or geographic radius or locus. The system, method and device broadly comprises a computer networking/cloud service that extends IT existing capabilities, in real time, over the Internet or a networking system, to users (subscription-based or pay-per-use service). The users are allowed to connect at a given location based on GPS latitude and longitude positions. The system broadly comprises: (i) a network/cloud service; (ii) registration means for registering a user; (iii) location determination means comprising global positioning system providing a local latitude and longitude location; (iv) on-location update means for publishing the availability of the service; (v) user location means carried out by the service for checking for other active sessions within a geographic region based on the location; (vi) data means for running a list of active sessions against a user compatibility engine; (vii) transmission of a notification to each user issuing a compatibility match listing compatible users in the location; (viii) intercommunication means wherein the user receives the compatibility match notification and can respond with a message, block or ignore based on the compatible user/users located in the location.

The present invention provides a peer-to-peer system for enabling interactive socialization of users at a location or geographic radius or locus. The system, method and device broadly provides a computer networking/cloud service that extends IT existing capabilities, in real time over the Internet or a networking system, to users (subscription-based or pay-per-use service) that notifies members of a compatibility match at a given location or local radius via GPS latitude and longitude positioning to connect at a given location.

The system is provided as an application for a mobile device/a wireless interactive device capable of (i) receiving and transmitting messages, (ii) accepting input via a user interface, and (iii) displaying messages on an electronic display; and comprises a registration means for registering a user or activating said system on said wireless interactive device.

Particularly, the subject system or application may be used for a dating application for meeting others, or as a networking/socializing application for people or users with similar interests. The subject system includes location determination means comprising a global positioning system that identifies the longitude and latitude of other users. The system further includes on-location update means for publishing the availability of the service at a given venue or vicinity thereof.

It is contemplated that the venue include the local vicinity of a given mile radius, depending on the type of venue. For example, in cases where the venue is a shopping mall or sporting event, the venue vicinity may include the venue's penumbra, such as a parking lot of the mall or event. During sporting events or concert events/or other entertainment events, the venue preferably includes the arena, while the vicinity includes the parking lot—so that tailgaters at the sporting event/concert event can meet through the application. The radius/vicinity can include a given radius such as, for example, 1 to 3 city blocks from one another or the like. The user location means is carried out by the system, which checks for other active sessions within the venue or vicinity. The system further includes data means for running a list of active sessions against a user compatibility engine. The system is appointed to transmit a notification to each user upon creation of a compatibility match; the notification lists compatible users at the venue. Intercommunication means is provided through the system/application, so that a user that receives the compatibility match notification can respond with a message, block or ignore with respect to the compatible user/users located at the venue.

In another embodiment, the system for enabling interactive socialization of users at a location or geographic radius or locus comprises (i) a network/cloud service, (ii) registration means for registering a user, (iii) location determination means comprising a global positioning system that provides a local latitude and longitude location, and (iv) on-location update means for publishing the availability of the service. The system also includes user location means carried out by the service for checking for other active sessions within a geographic region based on the location. Data means is also provided for running a list of active sessions against a user compatibility engine. Transmission of a notification is provided to each user issuing a compatibility match listing compatible users in the location. The system further includes intercommunication means wherein the user receives the compatibility match notification and can respond with a message, block or ignore based on the compatible user/users present at the location.

An electronic processing method for using the above system is also provided for generating a compatibility match notification of users at a location or geographic radius or locus. Generally stated, the system comprises a processing system containing one or more processors configured to receive applicable data, including registration data for a users, location data comprising global positioning system data providing local latitude and longitude locations, user compatibility data, on-location update capability for publishing availability of the system, and user location capability for checking for other users within the geographical radius or locus. The method further includes producing a compatibility recommendation from the user compatibility data and the location data and transmitting a notification to each user issuing a compatibility match at the location.

In another embodiment, the wireless interactive device includes a receiving device that receives said location of active users at a central processing station or distributed processing stations; a storage device that stores received said locations; a central processor adapted to process said locations and compare local said users compatibility data for determining said compatibility match listing; and transmission means for transmitting said compatibility match listing and location to said users within said location. Preferably, the device is appointed to be a cellular phone, smart phone, laptop, or smart phone or Smart pad.

The venue/location is preferably a public venue such as a shopping mall, grocery store, sport stadium, restaurant, bar or nightclub. The location or other niche locations are also provided, including churches, religious locations, tourist locations, sport locations, and/or professional meeting locations. The venue includes a local radius vicinity or penumbra of the venue. The vicinity may include a mile radius around an event/venue, and may include a parking lot around a venue, or the like. The system may further be integrated within the venue location network wherein a user can respond to a local compatibility match user by initiating a message through the venue itself. For example, where the venue is a bar or restaurant, the user can send a message to the venue location network to buy a drink or have a drink/message/delivered over to the compatible local user by way of a waiter/waitress at the venue. The system may further include mapping means/guidance technology of the type provided through known mapping systems (i.e. such as Google Maps®) so that the application of the system maps out each compatible user's location and guides each of the user's to one another.

Activation of the system/application on the wireless device may be automatic based on the venue and/or location of the user. For example, if the venue is a bar/restaurant, when a user walks through the door, the application in the wireless device can automatically become activated/or a prompt for activation may be transmitted to the wireless device or phone. In this manner, the user can then automatically be notified when other compatible users are local. Alternatively, rather than automatic activation, the user must initialize the system for activating the system on the wireless interactive device.

The user compatibility engine preferably includes compatibility data comprising sex, age, age range, interests, professional interests, hobbies, relationship status, physical attributes, physical activity level and/or sport team interests. Preferably, the compatibility match listing that is issued to each of said users in said location includes a compatibility rating score. If said compatibility rating score is less than a given score said users are not notified of each other's locations. Preferably, where the users have a significant number of matching criteria and/or hobbies or interests, or personality traits, the compatibility rating score may be provided as a numerical rating ranging between 85%-100%. Where the compatibility rating is somewhat less of a match, but includes some matching criteria, the numerical rating may be provided as a numerical rating ranging between 70%-84%. Less compatibility may be provided as a numerical rating ranging on a sliding scale of 55%-69%; 40-54%; 25%-39%; and 1%-25%. The users can then decide if they would like to reach out to the other use. If one of the users blocks or declines the notification request, the other user will not be directed to the direct position and location of the user. Only if both users accept the notification will each user be notified as to the exact location and profile/information attending to the other user, respectively. Optionally, a user may elect to only be notified of matches within or above a given range or compatibility match rating. For example, a user may specify that he/she only wants notifications relating to another user who is rated as an 85%-100% match.

Figure 2:
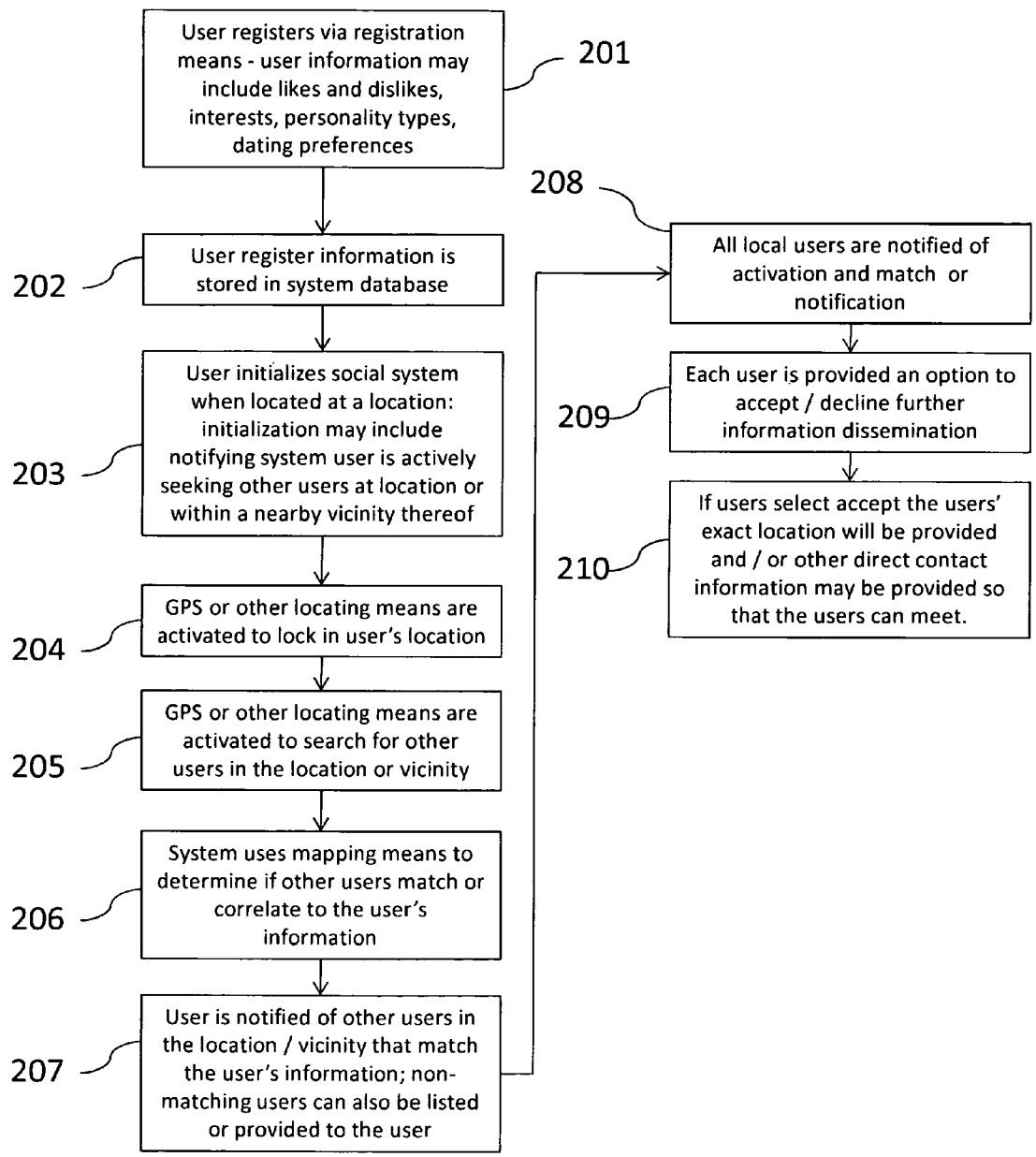
FIG. 2 is a block diagram generally illustrating the method and system applied on a platform.

FIG. 1 illustrates a basic schematic view of the platform of the system. FIG. 2 is a block diagram generally illustrating the method and system applied on the platform of FIG. 1.

Referring to FIG. 1, a network/cloud infrastructure 1 is configured in communication with users 2*a-n* and system app server 3 and telecom server 4. The network infrastructure 1 is achieved by means of the Internet, Intranet, VPN, LAN, Wired, WiFi, Wireless, Cell, Phone App . . . ).

Referring to FIG. 2, a user registers through the registration means. User information provided during registration may include likes and dislikes, interests, personality types, and dating preferences, as shown at 201. User register information is stored in system database at 202. In application generally, the user initializes the social system when physically present at a location. Initialization may include notifying the system that the user is actively seeking other users at the location or within a nearby vicinity thereof at 203. Note that initialization may be automatic, without the need for the user to have to notify the application. GPS or other locating means are activated to lock in user's location at 204. GPS or other locating means are activated to search for other users in the location or vicinity at 205. The system uses mapping means to determine if other users match or correlate to the user's information at 206. A user is notified of other users in the location/vicinity that match the user's information. Non-matching users can also be listed or provided to the user at 207. All local users are notified of activation and match or notification at 208. Each user is provided an option to accept/decline further information dissemination at 209. If users select accept, the users' exact location will be provided and/or other direct contact information may be provided so that the users can meet at 210.

Through use of the subject system/application users/members at a public establishment, such as a restaurant, shopping mall or the like, can meet. Using the subject system/application, users or members can enroll in the program to meet other users/members with similar interests. During enrollment, users enter information into an application to provide user profile information, which may include interest, personality information, hobbies, and/or status (single, etc.). After completing the application, the program stores user profile information for matching users and determining compatibility. In order to meet another user at a public establishment that is a participant in the program, a user signs onto the program. The program then computes the user's coordinates and advises the user of others in the immediate vicinity and alerts the user and/or other users of other users in the vicinity. This process facilitates meetings between program participants.

The subject system/application provides a peer-to-peer system for enabling interactive socialization of users at a location or geographic radius or locus; such system/application, as herein described, can be modified in numerous ways without departing from the scope of the invention. Optional platform technology can be utilized to equip the peer-to-peer system for enabling interactive socialization properties.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A system for enabling interactive socialization of users at a venue and employing a wireless interactive device capable of (i) receiving and transmitting messages, (ii) accepting input through a user interface, and (iii) displaying messages on an electronic display, the system comprising:
   a. a registration means for registering a user or activating said system on said wireless interactive device;
   b. location determination means comprising global positioning system;
   c. on-location update means for publishing the availability of the system;
   d. user location means carried out by said system for checking for other active sessions within said venue;
   e. data means for running a list of active sessions against a user compatibility engine;
   f. transmission means for transmitting a notification to each user issuing a compatibility match listing compatible users at said venue;
   g. intercommunication means wherein said user receives said compatibility match notification and can respond with a message, block or ignore based on the compatible user/users located at said venue;
   h. mapping means capable of mapping out each compatible user's location and guiding each of said user's to one another; and
   i. said venue including a local radius vicinity or penumbra of said venue.

2. A system for enabling interactive socialization of users at a venue as recited by claim 1, wherein said wireless interactive device includes a receiving device that receives said locations of active users at a central processing station or distributed processing stations; a storage device that stores said received locations; a central processor adapted to process said locations and compare local said users compatibility data for determining said compatibility match listing; and transmission means for transmitting said compatibility match listing and said locations to said users within said venue.

3. A system for enabling interactive socialization of users at a venue as recited by claim 1, wherein said venue is a public venue such as a shopping mall, grocery store, sport stadium, restaurant, bar or nightclub.

4. A system for enabling interactive socialization of users at a venue as recited by claim 1, wherein said venue is based on a group or niche location, such as a church or professional meeting or conference.

5. A system for enabling interactive socialization of users at a venue as recited by claim 1, wherein said activating of said system on said wireless interactive device is automatic, based on said venue and/or location of said user.

6. A system for enabling interactive socialization of users at a venue as recited by claim 1, wherein said user compatibility engine includes compatibility data comprising sex, age, age range, interests, professional interests, hobbies, relationship status, physical attributes, physical activity level and/or sport team interests.

7. A system for enabling interactive socialization of users at a venue as recited by claim 1, wherein said compatibility match listing that is issued to each of said users in said venue includes a compatibility rating score.

8. A system for enabling interactive socialization of users at a venue as recited by claim 7, wherein if said compatibility rating score is less than a given score said users are not notified of each other's locations.

9. A system for enabling interactive socialization of users at a venue as recited by claim 1, wherein said system is integrated within said venue and said user can respond with a message to said compatible user through said venue.

10. A system for enabling interactive socialization of users at a venue as recited by claim 1, wherein said user must initialize said system for activating said system on said wireless interactive device.

11. A system for enabling interactive socialization of users at a venue or geographic radius or locus, comprising:
   a. a network/cloud service;
   b. registration means for registering a user;
   c. location determination means comprising a global positioning system providing a local latitude and longitude location;
   d. on-location update means for publishing the availability of the service;
   e. user location means carried out by the service for checking for other active sessions within a geographic region based on the location;
   f. data means for running a list of active sessions against a user compatibility engine;
   g. transmission means for transmitting a notification to each user that contains a compatibility match listing compatible users in the venue;
   h. intercommunication means wherein the user receives the compatibility match notification and can respond with a message, block or ignore based on the compatible user/users located at the venue;
   i. mapping means capable of mapping out each compatible user's location and guiding each of said user's to one another; and
   j. said venue including a local radius vicinity or penumbra of said venue.

* * * * *